(12) United States Patent
Schoenherr et al.

(10) Patent No.: US 12,466,407 B2
(45) Date of Patent: Nov. 11, 2025

(54) METHOD FOR SETTING A CRUISE CONTROL FUNCTION WITH AUTOMATIC DISTANCE SETTING IN A SINGLE-TRACK VEHICLE

(71) Applicant: Robert Bosch GmbH, Stuttgart (DE)

(72) Inventors: Michael Schoenherr, Renningen-Malmsheim (DE); Daniel Vetter, Farmington Hills, MI (US); Felix Hellmann, Vienna (AT)

(73) Assignee: ROBERT BOSCH GMBH, Stuttgart (DE)

( * ) Notice: Subject to any disclaimer, the term of this patent is extended or adjusted under 35 U.S.C. 154(b) by 319 days.

(21) Appl. No.: 18/190,694

(22) Filed: Mar. 27, 2023

(65) Prior Publication Data

US 2023/0373482 A1    Nov. 23, 2023

(30) Foreign Application Priority Data

May 19, 2022    (DE) ...................... 10 2022 204 994.2

(51) Int. Cl.
 *B60W 30/16*    (2020.01)
 *B60W 40/06*    (2012.01)
(52) U.S. Cl.
 CPC ............ *B60W 30/16* (2013.01); *B60W 40/06* (2013.01); *B60W 2300/36* (2013.01); *B60W 2552/05* (2020.02); *B60W 2554/80* (2020.02)

(58) Field of Classification Search
 None
 See application file for complete search history.

(56) References Cited

U.S. PATENT DOCUMENTS

| | | | |
|---|---|---|---|
| 2020/0108830 A1* | 4/2020 | Grelaud | B60W 30/18163 |
| 2024/0001920 A1* | 1/2024 | Katayama | B60W 50/082 |

FOREIGN PATENT DOCUMENTS

| | | |
|---|---|---|
| DE | 112015003610 T5 | 5/2017 |
| DE | 102019201141 A1 | 8/2019 |
| DE | 102019200209 A1 | 7/2020 |
| DE | 102019205881 A1 | 10/2020 |
| EP | 3335955 A1 | 6/2018 |
| WO | 2019235395 A1 | 12/2019 |
| WO | 2020041188 A1 | 2/2020 |

* cited by examiner

*Primary Examiner* — David P. Merlino
(74) *Attorney, Agent, or Firm* — NORTON ROSE FULBRIGHT US LLP

(57) ABSTRACT

A method for setting a cruise control function with automatic distance setting in a single-track vehicle. In the method, a side distance between two preceding single-track vehicles is ascertained, a threshold value is determined as a function of the side distance, the side distance between one's own single-track vehicle and a preceding single-track vehicle is ascertained, and the preceding single-track vehicle is used as the target vehicle to be followed in the event that the side distance between one's own single-track vehicle and the preceding single-track vehicle is less than or equal to the threshold value.

12 Claims, 2 Drawing Sheets

METHOD FOR SETTING A CRUISE CONTROL FUNCTION WITH AUTOMATIC DISTANCE SETTING IN A SINGLE-TRACK VEHICLE

CROSS REFERENCE

The present application claims the benefit under 35 U.S.C. § 119 of German Patent Application No. DE 10 2022 204 994.2 filed on May 19, 2022, which is expressly incorporated herein by reference in its entirety.

FIELD

The present invention relates to a method for setting a cruise control function with automatic distance setting in a single-track vehicle.

BACKGROUND INFORMATION

Distance cruise control functions with the help of which the current vehicle speed is automatically set as a function of the distance to a preceding vehicle are known. Here, the driver can set a target speed in the adaptive cruise control, wherein the actual vehicle speed may be lower and may be guided by the speed of the preceding vehicle. The distance to the preceding vehicle is usually sensed using a radar device in the vehicle.

SUMMARY

A method according to the present invention relates to the setting of a cruise control function with automatic distance setting in a single-track vehicle. The single-track vehicle is, in particular, a motor-driven single-track vehicle, preferably a motor-driven two-wheeler, such as a motorcycle or a motor scooter. When the cruise control function is activated, the speed of the single-track vehicle is automatically set to a target speed, wherein both acceleration processes and braking processes are performed automatically. Due to the design as a cruise control function with automatic distance setting, the actual speed can be set as a function of a preceding vehicle that is detected using a distance detection unit. The actual speed can be adapted to the speed of the preceding vehicle, wherein the following vehicle maintains a speed-dependent distance to the preceding vehicle.

The method according to an example embodiment of the present invention can be used in a group trip of single-track vehicles. When the cruise control function is activated with a specified target speed, the side distance between two preceding single-track vehicles is first ascertained using the distance detection unit. The side distance is indicative of the lateral distance transverse to the longitudinal direction between the two preceding single-track vehicles.

In a following method step, a threshold value is ascertained, which is calculated as a function of the previously determined side distance between the two preceding single-track vehicles. Thereafter, the side distance between one's own single-track vehicle (hereinafter: ego vehicle) and a preceding single-track vehicle, in particular the directly preceding single-track vehicle, is ascertained.

Finally, in a further method step, the, in particular directly, preceding single-track vehicle is used as the target vehicle to be followed for the cruise control function in the event that the side distance between the ego vehicle and the, in particular directly, preceding single-track vehicle is less than or equal to the threshold value.

This procedure may have the advantage that the cruise control function automatically decides whether the trip is a group trip and the ego vehicle, as part of the group, follows a preceding single-track vehicle. The decision can be made with existing hardware of a cruise control function with automatic distance setting; no additional hardware is required. To the extent that it is automatically detected that the trip is a group trip that includes the ego vehicle, the ego vehicle follows a preceding single-track vehicle that is part of the group. If, on the other hand, the evaluation reveals that the mentioned conditions for participation of the ego vehicle in the group trip are not present, which is the case if the threshold value is exceeded, the speed in the ego vehicle is also not adapted to the speed of the preceding single-track vehicle. In this case, in particular in the case of a higher target speed in comparison to the speed of the preceding single-track vehicles, an overtaking process of the ego vehicle is performed until the target speed is reached.

The ascertainment of the side distance between the two preceding single-track vehicles and between the ego vehicle and a preceding single-track vehicle can be performed using a distance detection unit, which is part of a distance cruise control device for performing the method. The distance detection unit is, in particular, a radar-based distance detection unit, with the help of which both the longitudinal distance between the ego vehicle and one or more preceding vehicles and the side distance between two preceding vehicles and between the ego vehicle and a preceding vehicle can be ascertained. The resolution of the radar-based distance detection unit is good enough to ascertain both the longitudinal distance and the transverse distance.

The method according to the present invention can be applied to situations in which at least two single-track vehicles travel ahead of the ego vehicle. More than two single-track vehicles may be located ahead of the ego vehicle. Using the sensor system, associated with the distance detection unit, in the ego vehicle, the side distance between two directly preceding single-track vehicles as well as between the ego vehicle and the closest preceding single-track vehicle is in particular ascertained.

According to an advantageous embodiment of the present invention, the threshold value that is used as a basis for the comparison to the side distance between the ego vehicle and the preceding single-track vehicle is set to a greater value than the side distance between the two preceding single-track vehicles. For example, the threshold value is at least 10%, at least 20%, at least 30%, at least 40%, or at least 50% greater than the side distance between the two preceding single-track vehicles. By setting the threshold value to a greater value than the side distance, there is sufficient tolerance for the ego vehicle to join the group trip and attach itself to the preceding single-track vehicle.

According to yet a further advantageous embodiment of the present invention, the threshold value is limited to a maximum value. This ensures that the ego vehicle is only detected as being part of the group trip if it is located within a limited lateral distance. A distinction can be made between a group trip and an overtaking process. The maximum value is, for example, set to the roadway width or lane width of the road on which the preceding single-track vehicles are currently moving.

According to yet a further advantageous embodiment of the present invention, the method steps are performed at regular intervals so that correspondingly regularly, the threshold value is adjusted and the interrogation is performed as to whether the ego vehicle is to follow the preceding single-track vehicle. On the one hand, this interrogation can be used to detect situations in which the group trip disbands, for example by one or more preceding single-track vehicles veering. It is also possible to detect other changing conditions, for example, the threshold value being exceeded by an increasing side distance between the ego vehicle and the preceding single-track vehicle.

According to yet a further advantageous embodiment of the present invention, the threshold value can additionally be determined as a function of further parameters or system variables, in particular as a function of a road characteristic value, such as the road type or road width. For example, during trips on highways, the threshold value may be limited to a higher maximum value than during trips on smaller roads, particularly in the city. For example, the detection of the road type may be performed using a navigation system or on the basis of a traffic sign detection system. The current road width results on the one hand from the road type; on the other hand, the road width can also be detected via a sensory system in the ego vehicle, regardless of the detection of the road type.

According to an example embodiment of the present invention, the method steps are carried out in a control unit that is part of a distance cruise control device in the ego vehicle or is installed independently of the distance cruise control device in the ego vehicle. The control unit can be used to, in particular, evaluate sensor information of the distance detection unit and to automatically set the speed of the ego vehicle by controlling the drive motor and, where appropriate, a braking system in the ego vehicle.

The present invention also relates to a distance cruise control device in a single-track vehicle comprising a previously described control unit, a device for automatically setting the speed, and a distance detection unit for detecting the longitudinal distance to a preceding single-track vehicle and for detecting the side distance between two single-track vehicles that both travel ahead of the ego vehicle, or the side distance between the ego vehicle and a preceding vehicle. The device for automatically setting the speed may be formed by the control unit itself, in which control signals to be supplied to the drive motor and the braking system are generated.

The present invention also relates to a single-track vehicle, such as a motorcycle or a motor scooter, which is equipped with a previously described distance cruise control device.

The present invention also relates to a computer program product comprising a program code which is designed to execute the previously described method steps. The computer program product runs in an above-described control unit.

Further advantages and expedient embodiments of the present invention can be found in the figure description and the figures.

In the figures, identical components are provided with identical reference signs.

DETAILED DESCRIPTION OF EXAMPLE EMBODIMENTS

Figure 1A:
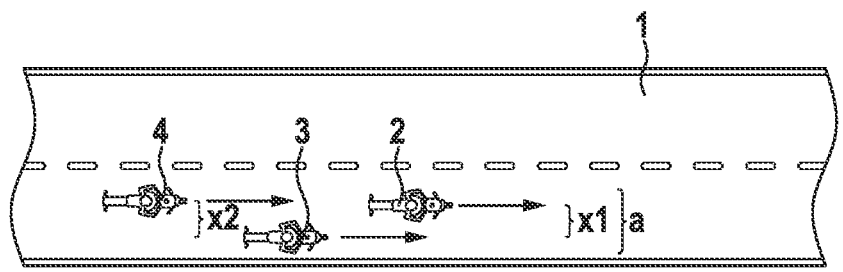
FIG. 1A shows a top view of three motorcycles, which are all part of a group trip.

FIG. 1A shows a top view of a group of single-track vehicles designed as motorcycles and traveling along a lane of a road 1. The two preceding motorcycles 2 and 3 travel one after the other at an offset and have a side distance $x_1$ to one another with respect to the longitudinal extension of the road 1 and the direction of travel of the motorcycles. The following motorcycle 4 is equipped with a cruise control function with automatic distance setting, which allows following one of the preceding motorcycles 2, 3, where appropriate, in particular the directly preceding motorcycle 3. In this case, the longitudinal distance between the preceding motorcycle 3 and the following single-track vehicle 4 (ego vehicle) is ascertained using a distance detection unit, which in particular comprises a radar system.

The distance detection unit also allows ascertaining both the side distance $x_1$ between the two preceding motorcycles 2 and 3 and the side distance $x_2$ between the directly preceding vehicle 3 and the ego vehicle 4. When the cruise control function is activated with a specified target speed that is higher than the speed of the preceding motorcycles 2, 3, the ego vehicle 4 can perform, depending on the side distance $x_2$, either an overtaking process or a group trip with the preceding motorcycles 2, 3.

Whether the two preceding motorcycles 2, 3 together with the ego vehicle 4 form a group in which the ego vehicle 4 moves is detected via a comparison of the current side distance $x_2$ between the ego vehicle 4 and the directly preceding motorcycle 3 to a threshold value a, which is determined as a function of the side distance $x_1$ between the two preceding motorcycles 2, 3.

Here, it is expedient for the threshold value a to be greater than the side distance $x_1$ between the motorcycles 2, 3. For example, the threshold value a may be half as large as the side distance $x_1$ but limited to a maximum value, for example, to the roadway width or lane in which the motorcycles 2, 3, 4 move on the road 1.

FIG. 1A shows a travel situation in which the side distance $x_2$ between the ego vehicle 4 and the directly preceding motorcycle 3 is less than the previously determined threshold value a, which is determined as a function of the side distance $x_1$ between the two preceding motorcycles 2, 3. In this case, a group trip is assumed, whereupon the cruise control function with automatic distance setting is performed in such a way that the ego vehicle 4 attaches itself to and follows the directly preceding motorcycle 3 as the target vehicle. Accordingly, via the cruise control function, the speed of the ego vehicle 4 is set by controlling the drive motor in the ego vehicle 4 and, where appropriate, the braking system.

Figure 1B:
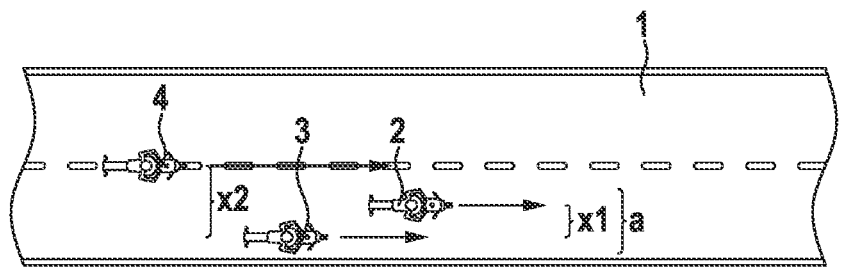
FIG. 1B shows a top view of the three motorcycles, wherein the third, following motorcycle starts to overtake.

FIG. 1B shows a design variant with the same initial situation of the preceding motorcycles 2 and 3, which, relative to one another, have the side distance $x_1$, from which the threshold value a is ascertained. However, in contrast to FIG. 1A, in FIG. 1B, the side distance $x_2$ between the ego vehicle 4 and the directly preceding motorcycle 3 is greater than the threshold value a. In this case, not a group trip but an overtaking process performed by the ego vehicle 4 is assumed. Accordingly, the current speed of the ego vehicle 4 is not adapted to the speed of the preceding motorcycle 3, but the ego vehicle 4 is accelerated to the set target speed, which is higher than the speed of the preceding motorcycle 3.

Figure 2A:
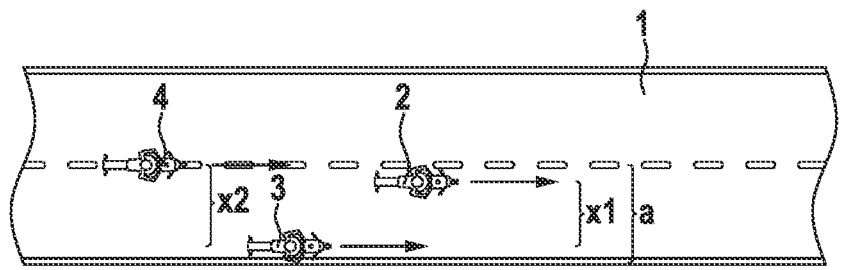
FIGS. 2A and 2B show further top views as in FIGS. 1A and 1B but with a greater lateral distance between the two preceding motorcycles.

FIG. 2A shows a travel situation with three motorcycles 2, 3, 4 on a road, which is basically comparable to the travel situation according to FIG. 1A. However, in FIG. 2A, the side distance $x_1$ between the two preceding motorcycles 2, 3 is greater, and the side distance $x_2$ between the ego vehicle 4 and the directly preceding motorcycle 3 is also greater. From the side distance $x_1$, the threshold value a is calculated, which corresponds to approximately the roadway width. Since the threshold value a is greater than the side distance $x_2$ between the ego vehicle 4 and the directly preceding motorcycle 3, a group trip is assumed and the speed of the vehicle 4 is adapted to the speed of the directly preceding motorcycle 3.

Figure 2B:
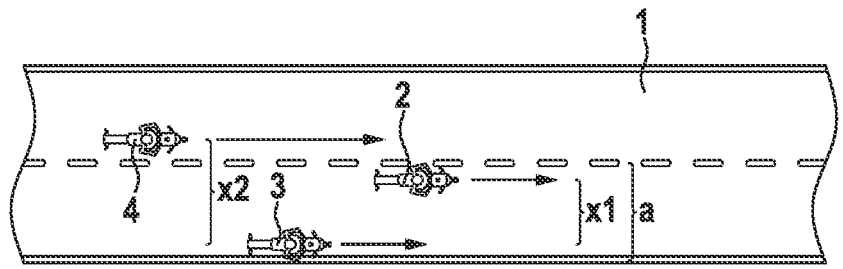

In FIG. 2B, in which the two preceding motorcycles 2, 3 have the same distance $x_1$ as in FIG. 2A, the side distance $x_2$ of the ego vehicle 4 to the directly preceding motorcycle 3 is greater than the threshold value a so that a group trip is not assumed and the ego vehicle 4 does not attach itself to the preceding motorcycle 3. Rather, an overtaking process is assumed, in which the ego vehicle 4 accelerates to the set target speed.

Figure 3:
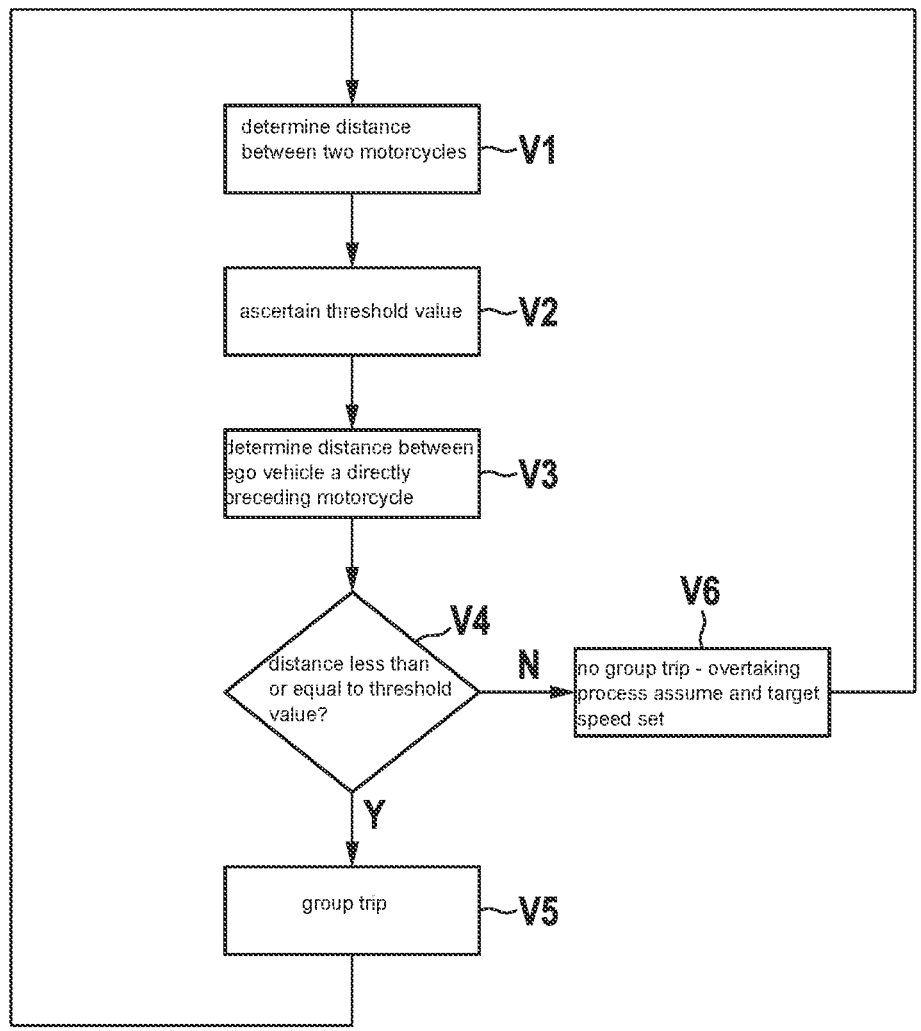
FIG. 3 shows a flow chart showing method steps for setting a cruise control function with automatic distance setting in a single-track vehicle, according to an example embodiment of the present invention.

FIG. 3 shows a flow chart for performing the method steps for setting the cruise control function, according to an example embodiment of the present invention. The flow chart is based on activating the cruise control function in the ego vehicle and setting a target speed in the cruise control function.

First, in a first method step V1, the side distance $x_1$ between two preceding motorcycles is determined. Then, in the next method step V2, a threshold value a is ascertained, which is determined as a function of the side distance $x_1$. Here, it is expedient to set the threshold value a to a value greater than the side distance $x_1$, but limited to a maximum value that is in particular half the lane width. Where appropriate, further variables, for example, the road type, such as highway, country road, or city road, can be taken into account in the determination of the threshold value a.

In the following method step V3, the current side distance $x_2$ between the ego vehicle and the directly preceding motorcycle is determined. Then, in method step V4, the interrogation as to whether the side distance $x_2$ between the ego vehicle and the directly preceding motorcycle is less than or equal to the threshold value a takes place. If this is the case, following the Yes branch ("Y"), the method continues with the next method step V5, according to which there is a group trip of the motorcycles and the ego vehicle follows the directly preceding motorcycle.

If, on the other hand, the interrogation in method step V4 reveals that the side distance $x_2$ is greater than the threshold value a, a group trip cannot be assumed. In this case, following the No branch ("N"), the method continues with method step V6, according to which an overtaking process of the ego vehicle is assumed and the target speed set in the cruise control function is reached in the ego vehicle.

Both after method step V5 and after method step V6, the method returns to method step V1 and the entire method is once again performed at cyclic intervals.

The various method steps are carried out in a control unit, which may be part of a distance cruise control device in the single-track vehicle. The latter also comprises a distance detection unit for detecting the longitudinal distance to a preceding vehicle and for detecting the side distance between two single-track vehicles. After evaluation of all information, control signals for setting the drive motor and, where appropriate, the braking system can be generated via the control unit.

What is claimed is:

1. A method for setting a cruise control function with automatic distance setting in a single-track vehicle, comprising the following steps:
    ascertaining a side distance between two preceding single-track vehicles;
    determining a threshold value as a function of the side distance between the two preceding single-track vehicles;
    ascertaining a side distance between an ego single-track vehicle and a preceding single-track vehicle of the two preceding vehicles;
    using the preceding single-track vehicle as a target vehicle to be followed for the cruise control function in the event that the side distance between the ego single-track vehicle and the preceding single-track vehicle is less than or equal to the threshold value.

2. The method according to claim 1, wherein the threshold value is set to a greater value than the side distance between the two preceding single-track vehicles.

3. The method according to claim 1, wherein the threshold value is limited to a maximum value.

4. The method according to claim 3, wherein the maximum value is a roadway width of a road on which the ego and the two preceding single-track vehicles are currently moving.

5. The method according to claim 1, wherein the method steps are performed regularly with an ascertainment and possible adjustment of the threshold value of the side distance between the ego single-track vehicle and a preceding single-track vehicle, and of the side distance between two preceding single-track vehicles.

6. The method according to claim 1, wherein a target speed is specified in the cruise control function, acceleration to the target speed taking place in the event that the side distance between the ego single-track vehicle and the preceding single-track vehicle is greater than the threshold value.

7. The method according to claim 1, wherein the threshold value is additionally ascertained as a function of a road characteristic value.

8. The method according to claim 7, wherein the road characteristic value is a road type or a road width.

9. A control unit configured to set a cruise control function with automatic distance setting in a single-track vehicle, the control unit comprising a processor and memory, the processor configured to execute software instructions stored in the memory to perform the functions of:
    ascertain a side distance between two preceding single-track vehicles;
    determine a threshold value as a function of the side distance between the two preceding single-track vehicles;
    ascertain a side distance between an ego single-track vehicle and a preceding single-track vehicle of the two preceding vehicles;
    use the preceding single-track vehicle as a target vehicle to be followed for the cruise control function in the event that the side distance between the ego single-track vehicle and the preceding single-track vehicle is less than or equal to the threshold value.

10. A distance cruise control device in a single-track vehicle, comprising:

a control unit configured to set a cruise control function with automatic distance setting in a single-track vehicle, the control unit comprising a processor and memory, the processor configured to execute software instructions stored in the memory to perform the functions of:
  ascertain a side distance between two preceding single-track vehicles,
  determine a threshold value as a function of the side distance between the two preceding single-track vehicles,
  ascertain a side distance between an ego single-track vehicle and a preceding single-track vehicle of the two preceding vehicles, and
  use the preceding single-track vehicle as a target vehicle to be followed for the cruise control function in the event that the side distance between the ego single-track vehicle and the preceding single-track vehicle is less than or equal to the threshold value; and
a distance detector configured to detect a longitudinal distance to the preceding single-track vehicle and to detect the side distance between the two single-track vehicles.

11. A motorcycle, comprising:
a distance cruise control device including
  a control unit configured to set a cruise control function with automatic distance setting in a single-track vehicle, the control unit comprising a processor and memory, the processor configured to execute software instructions stored in the memory to perform the functions of:
    ascertain a side distance between two preceding single-track vehicles,
    determine a threshold value as a function of the side distance between the two preceding single-track vehicles,
    ascertain a side distance between an ego single-track vehicle and a preceding single-track vehicle of the two preceding vehicles, and
    use the preceding single-track vehicle as a target vehicle to be followed for the cruise control function in the event that the side distance between the ego single-track vehicle and the preceding single-track vehicle is less than or equal to the threshold value; and
  a distance detector configured to detect a longitudinal distance to the preceding single-track vehicle and to detect the side distance between the two single-track vehicles.

12. A non-transitory computer-readable medium on which is stored a computer program including program code for setting a cruise control function with automatic distance setting in a single-track vehicle, the program code, when executed by a control unit, causing the control unit to perform the following steps:
  ascertaining a side distance between two preceding single-track vehicles;
  determining a threshold value as a function of the side distance between the two preceding single-track vehicles;
  ascertaining a side distance between an ego single-track vehicle and a preceding single-track vehicle of the two preceding vehicles;
  using the preceding single-track vehicle as a target vehicle to be followed for the cruise control function in the event that the side distance between the ego single-track vehicle and the preceding single-track vehicle is less than or equal to the threshold value.

* * * * *